US009886216B2

(12) United States Patent
Bennion

(10) Patent No.: US 9,886,216 B2
(45) Date of Patent: Feb. 6, 2018

(54) DISTRIBUTED REMOTE DATA STORAGE ACCESS

(71) Applicant: Western Digital Technologies, Inc., Irvine, CA (US)

(72) Inventor: Matthew Bennion, Dana Point, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 712 days.

(21) Appl. No.: 14/280,208

(22) Filed: May 16, 2014

(65) Prior Publication Data
US 2015/0286412 A1 Oct. 8, 2015

Related U.S. Application Data

(60) Provisional application No. 61/976,706, filed on Apr. 8, 2014.

(51) Int. Cl.
G06F 12/00 (2006.01)
G06F 3/06 (2006.01)
G06F 11/14 (2006.01)

(52) U.S. Cl.
CPC ............ G06F 3/067 (2013.01); G06F 3/065 (2013.01); G06F 3/0611 (2013.01); G06F 3/0688 (2013.01); G06F 11/14 (2013.01)

(58) Field of Classification Search
CPC .................. G06F 12/0813; G06F 17/30
See application file for complete search history.

(56) References Cited

U.S. PATENT DOCUMENTS

| 6,499,054 | B1 | 12/2002 | Hesselink et al. |
| 6,732,158 | B1 | 5/2004 | Hesselink et al. |
| 6,954,753 | B1 * | 10/2005 | Jeran ................. G06F 17/30091 |
| 7,111,116 | B1 | 9/2006 | Boyle et al. |
| 7,120,692 | B2 | 10/2006 | Hesselink et al. |

(Continued)

FOREIGN PATENT DOCUMENTS

| KR | 1020130116538 | 10/2013 |
| WO | 2010/104471 A1 | 9/2010 |

OTHER PUBLICATIONS

International Search Report and Written Opinion dated Jun. 30, 2015 from related PCT Serial No. PCT/US2015/024136, 16 pages.
European Search Report for PCT/US2015/024136 dated Nov. 7, 2017.

Primary Examiner — Reginald Bragdon
Assistant Examiner — Hannah A Faye-Joyner
(74) Attorney, Agent, or Firm — Chang & Hale LLP

(57) ABSTRACT

Systems and methods are disclosed for accessing data over a distributed data storage network. A network-attached storage device (NAS) includes a non-volatile memory module comprising a first portion of data storage for storing local user data associated with a host computing device and a second shared portion of data storage for storing third-party data. The NAS includes a controller configured to provide copies of a portion of the user data to one or more other NAS's for storage therein, receive third-party data from each of the one or more other NAS's, and store the received third-party data in the second portion of data storage. The NAS is configured to upload at least a portion of the user data to the host computing device and upload at least a portion of the third-party data to at least one of the one or more other NAS.

21 Claims, 5 Drawing Sheets

(56) References Cited

U.S. PATENT DOCUMENTS

| | | |
|---|---|---|
| 7,454,443 B2 | 11/2008 | Ram et al. |
| 7,467,187 B2 | 12/2008 | Hesselink et al. |
| 7,526,668 B2 | 4/2009 | Shitomi et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 2002/0095557 A1* | 7/2002 | Constable ............ G06F 3/0614 711/163 |
| 2003/0009623 A1* | 1/2003 | Arimilli ............ G06F 12/0813 711/119 |
| 2005/0144195 A1 | 6/2005 | Hesselink et al. |
| 2005/0144200 A1 | 6/2005 | Hesselink et al. |
| 2007/0067263 A1 | 3/2007 | Husain et al. |
| 2007/0192551 A1 | 8/2007 | Hara et al. |
| 2008/0256386 A1 | 10/2008 | Boerger et al. |
| 2008/0270574 A1 | 10/2008 | Hanes |
| 2012/0036041 A1 | 2/2012 | Hesselink |
| 2013/0066830 A1 | 3/2013 | Lacapra et al. |
| 2013/0117502 A1 | 5/2013 | Son et al. |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0006354 A1 | 1/2014 | Parkison |
| 2014/0095439 A1 | 4/2014 | Ram |
| 2014/0169921 A1 | 6/2014 | Carey |
| 2014/0173215 A1 | 6/2014 | Lin et al. |

* cited by examiner

DISTRIBUTED REMOTE DATA STORAGE ACCESS

RELATED APPLICATION

This application claims the benefit of priority under 35 U.S.C. § 119(e) of U.S. Provisional Application No. 61/976,706, filed on Apr. 8, 2014, and entitled "Distributed Remote Data Storage Access," the disclosure of which is hereby incorporated by reference in its entirety.

BACKGROUND

Field

This disclosure relates to data storage systems. More particularly, the disclosure relates to systems and methods for remotely accessing distributed data storage.

Description of Related Art

Distribution of data storage across one or more data storage devices can provide increased data security and/or data access through data redundancy. Network-attached storage devices provide access to data over computer networks.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Figure 1:
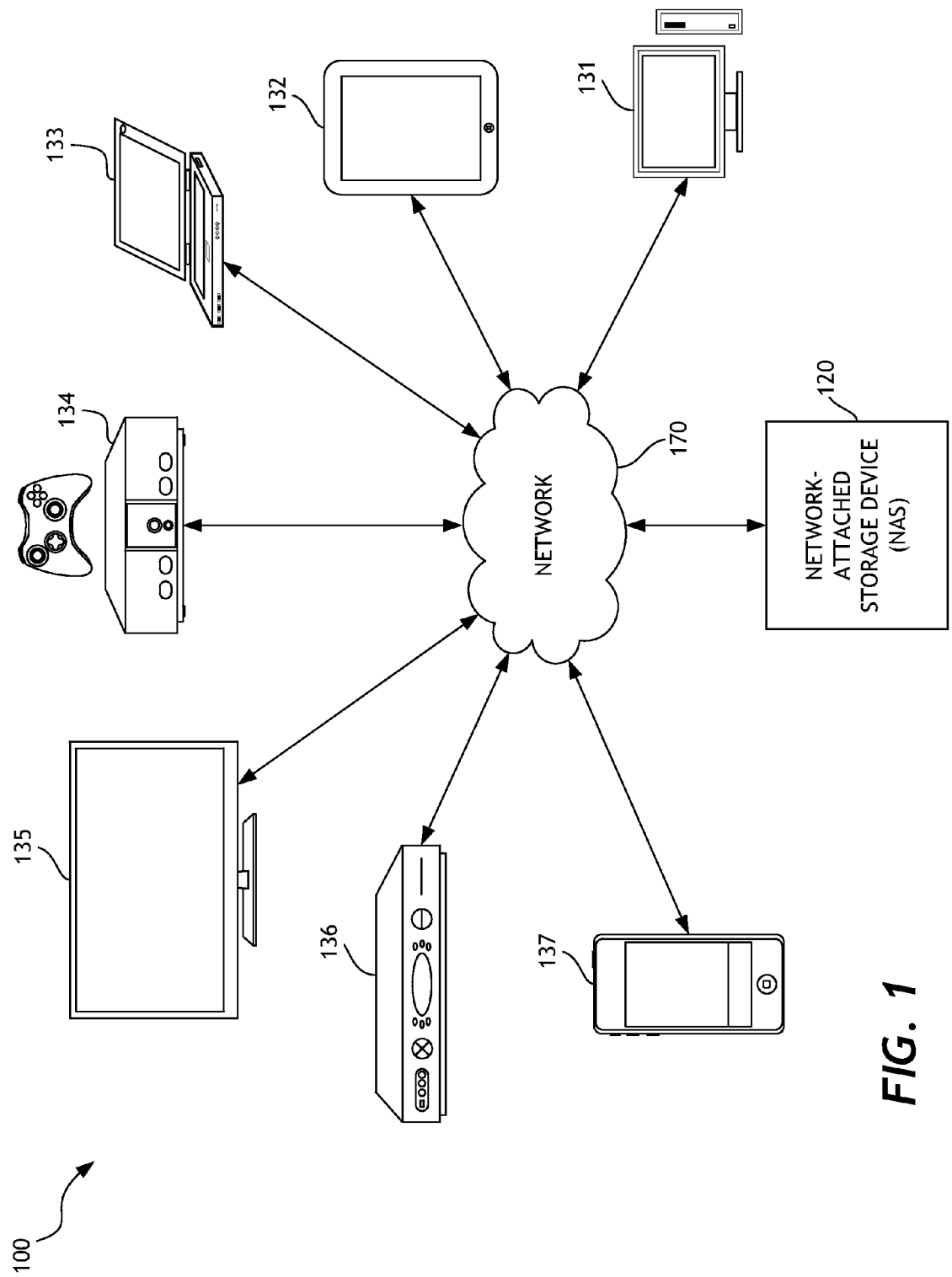
FIG. 1 is a diagram of a networked data storage system according to an embodiment.

Network-attached storage (NAS) drives/systems can provide file-level data storage over a computer network, wherein access to the stored data is accessible to one or more clients. For example, a NAS may include hardware, software, or a combination of such elements, configured such that the NAS operates as a file server. NAS devices/systems can provide a convenient mechanism for remotely accessing user data. FIG. 1 is a diagram illustrating an embodiment of a NAS system 100, in which a network-attached storage device (NAS) 120 is communicatively coupled to one or more client devices in order to provide file-based data storage services to devices on the network 170. Types of client devices that may have access to the NAS 120 can include phones 137, such as smartphones, cable set-top boxes 136, smart TV's 135, video game consoles 134, laptop computers 133, tablet computers 132, desktop computers 131, wearable computers and/or other network-connected computing devices. The network may be a local area network (LAN), a wide area network (WAN) (e.g., the Internet), or other type of computer network.

While certain embodiments are described herein in the context of NAS devices/systems, it should be understood that references herein to NAS's may refer to other types of data storage devices/systems, such as any type of computer device implementing software allowing for data storage access over a network.

In certain embodiments, the NAS 120 provides only file-based services. Alternatively, the NAS 120 may be configured to run software to provide additional server functionality. In certain embodiments, the NAS 120 may be configurable over the network 170 by a client device interface, such as a web browser of a mobile or desktop computing device. For example, a low-level operating system may be implemented in the NAS, such as FreeNAS, which is an open source NAS solution designed for commodity PC hardware. The NAS 120 may provide access to files using one or more network file-sharing protocols, such as NFS, SMB/CIFS, AFP, or the like.

In certain embodiments, NAS devices can provide remote access to various types of user data by host devices, such as mobile devices, computers, and other Internet-connected devices, for example. However, use of NAS devices for remote access purposes can involve certain performance constraints. For example, access to data may be limited by the upload speed of the NAS, which may depend on the network connection of the NAS (e.g., WiFi, Ethernet, etc.). When accessing, for example, large video files, or the like, the bottleneck created by the NAS upload speed may lead to undesirable buffering or other delays. In addition to performance considerations, when using a single NAS device for data storage, corruption or failure of the NAS may lead to data loss.

Certain embodiments disclosed herein provide for distribution of data among a plurality of NAS devices, wherein data may be streamed simultaneously from multiple devices, thereby improving upload speed. Furthermore, distributed data storage as described herein may advantageously provide improved data protection through redundancy of data stored in multiple locations.

Distributed Network-Attached Storage System

Figure 2:
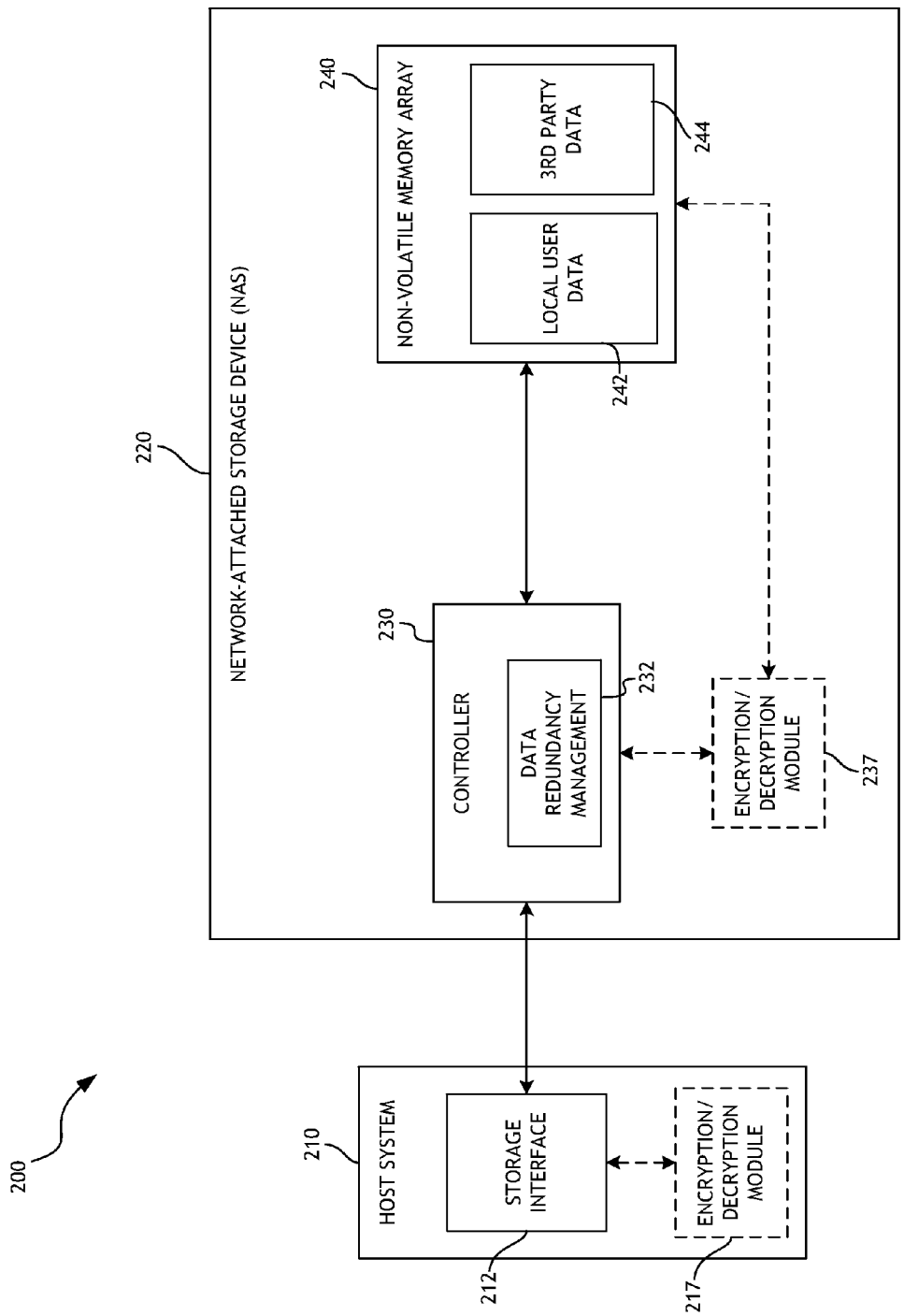
FIG. 2 is a diagram of a data storage system according to an embodiment.

FIG. 2 is a block diagram illustrating a network-attached storage device (NAS) 220 according to an example embodiment. Referring to FIG. 2, a NAS device 220 may include a controller 230 and a non-volatile memory array 240. In an embodiment, the non-volatile memory array 240 comprises non-volatile magnetic media, and/or solid-state memory, such as NAND flash. The controller 230 may provide overall control for the NAS 220. In certain embodiments, the NAS 220 is a hard disk drive. The non-volatile memory array 240 may include one or more disks, wherein the NAS 220 further comprises one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the NAS 220 may be, for example, a hybrid hard drive including both magnetic media and solid-state media.

The controller 230 may receive data and storage access commands from a storage interface 212 (e.g., a device driver) of a host system 210. In certain embodiments, the storage interface 212 utilizes a DNS server in communicating with the NAS 220; the NAS may be callable through a web address URL. Storage access commands communicated by the storage interface 212 may include write and read commands issued by the host system 210. The storage access commands may specify an LBA, or range of LBAs, in the NAS 220, and the controller 230 may execute the received storage access commands in the non-volatile memory array 240. In a hybrid hard drive, data may be stored in a magnetic media storage component as well as non-volatile solid-state memory.

The connection between the host system 210 and the NAS 220 may be wired, such as through Ethernet, USB, or other connection, or may be wireless, such as through WiFi, Bluetooth, or other wireless connection. In certain embodiments, the connection between the host system 210 and the NAS 220 is achieved over the Internet, wherein each of the host system 210 and the NAS 220 is connected to the Internet over a wired or wireless connection.

The NAS 220 may store data received from the host system 210, such that the NAS 220 acts as memory for the host system 210. To facilitate this memory function, the controller 230 may implement a logical interface. The logical interface may present to the host system 210 the memory of the NAS 220 as a set of logical addresses (e.g., contiguous address) where data can be stored. The controller 230 may map logical addresses to various physical memory addresses in the non-volatile memory array 240 and/or other memory module(s).

The NAS 220 may be a self-encrypting drive (SED), wherein the NAS is configured to encrypt host data using an encryption/decryption module 237. For example, the encryption/decryption module 237 may be configured to encrypt user data using media encryption keys and store the data in the non-volatile memory array 240. Encryption key management, including generation, exchange, storage, usage, and/or replacement of keys, and/or key scheduling, may be performed at least in part by the controller 230, encryption/decryption module 237 and/or other components of the NAS 220.

In one example embodiment, the encryption/decryption module 237 is configured to encrypt/decrypt data according to one or more keys selected on a per-command basis. The encryption/decryption module 237 may utilize different types of keys, and may use multiple keys. For example, the NAS 220 may utilize symmetric keys and/or asymmetric keys. In certain embodiments, encryption keys are 128 or 256 bit Advanced Encryption Standard (AES) keys. In certain embodiments, the controller 230 may perform at least a portion of the functions of the encryption/decryption module 237.

In embodiments in which the NAS 220 includes self-encrypting functionality, encryption may be implemented according to one of the following encryption models: (1) file-based encryption, wherein encryption keys are associated with host I/O commands issued to the relevant storage device; (2) raw data encryption, wherein encryption keys are associated with sets of logical block addresses (LBAs) and offset LBAs within data base record(s); and self-encrypting device (SED) encryption, wherein encryption keys are associated with LBA ranges (or logical page ranges). Self-encrypting technology may be integrated in the NAS 220, or may be embodied in third-party drive-management software.

In certain embodiments, the NAS 220 may not include encryption functionality, and may receive encrypted user data from the host system 210. For example, the host system 210 may include encryption/decryption circuitry 217 for performing encryption/decryption of data transmitted to and/or from the NAS 220.

The NAS 220 may be configured to implement data redundancy, wherein user data stored in the memory array 240 is maintained in one or more internal and/or external drives. For example, the controller 230 may include a data redundancy management module 232 configured to implement redundancy functionality. The data redundancy management module 232 may implement redundant array of independent disks (RAID) technology, wherein the non-volatile memory array 240 includes a plurality of internal drives, disks, or other data storage partitions combined into a logical unit for the purposes of data redundancy and performance improvement. In addition, or alternatively, the data redundancy management module 232 may be configured to implement RAID using one or more internal memory modules in combination with one or more external memory devices, as discussed in greater detail below.

For RAID purposes, the non-volatile memory array 240 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile memory array 240 may include one or more additional memory modules configured to store parity information.

The controller 230 may be configured to divide and replicate user data among the physical RAID memory modules, providing storage virtualization; the array may be accessed by the host system 210 as a single drive. Data may be distributed across the RAID memory modules/drives according to any desirable or practical RAID level, depending on the level of redundancy and/or performance desired. For example, the NAS 220 may be configured to implement RAID 0, RAID 1, RAID 5, RAID 10, or other RAID technology, depending on data reliability, availability, performance and/or capacity considerations or requirements.

With respect to remotely accessing data stored in the non-volatile memory array 240 by the host system 210, the access performance may be limited by the upload speed of the network over which the NAS is connected to the Internet (e.g., approximately 2-5 Mbps), or other network connection connecting the host system 210 to the NAS 220. To improve data access performance, the NAS 220 may be configured to implement data storage sharing with one or more other data storage drives (e.g., NAS's). By distributing user data to one or more other network-attached drives (e.g., with redundancy and encryption), remote data access speed may be increased when data is drawn from multiple locations. In certain embodiments, at least a portion of user data is replicated at one or more other NAS devices in a RAID-like manner.

According to a data storage sharing protocol, the controller 230 may be configured to locally store user data in a partitioned segment 242 of the non-volatile memory array 240. Furthermore, at least a portion of the locally-stored user data may also be stored in one or more other data storage drives, which may or may not be owned and/or operated by third parties. The controller 230 may implement a technology that allows for automatic replication (e.g., according to a predetermined schedule) of at least a portion of the user data to a second drive at a different location. According to the data storage sharing protocol, at least a portion 244 of the non-volatile memory array 240 may also be designated for storage of user data native to the other storage drives with which a data storage sharing relationship is established.

The data stored on shared device(s) may comprise copies of data stored locally in the non-volatile memory array 240, thereby providing improved data reliability and/or accessibility. Furthermore, such data storage sharing among multiple devices may provide improved data uploading performance by allowing the host system 210 to download from the NAS 220 and one or more other shared devices simultaneously. By dividing the uploading load across multiple shared devices, content upload may require less bandwidth usage, which may help Internet speeds for one or more of the shared devices.

Figure 3:
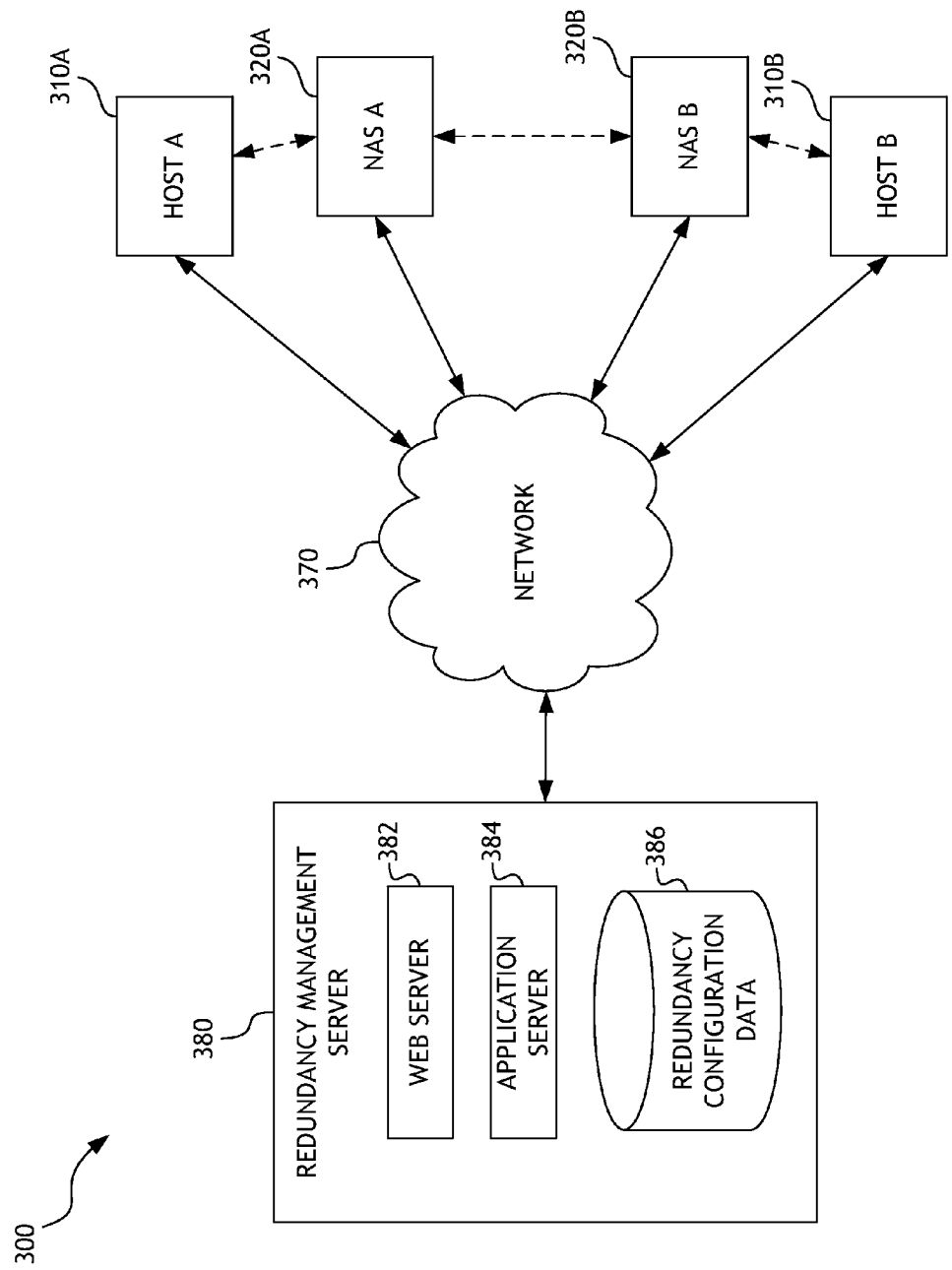
FIG. 3 is a diagram of a distributed data storage system according to an embodiment.

FIG. 3 illustrates an embodiment of a system 300 for managing data redundancy in a shared data storage environment. The system 300 includes a redundancy management server 380. The redundancy management server 380 illustrated in FIG. 3 corresponds to a logical association of one or more computing devices associated with a redundancy management service provider. Specifically, the server 380 can include a web server component 382 corresponding to one or more server computing devices for obtaining and processing requests for content (such as Web pages) from client devices (e.g., Host A 310A, Host B 310B). In certain embodiments, a user may access the web server 382 of the redundancy management server 380 over a wide area network (WAN) 370, such as the Internet, and establish an account with the server 380 for managing data redundancy and remote access for a NAS accessible by the host. For example, Host A 310 may connect to the web server 382 and indicate a desire to include NAS A 320A in a storage sharing pool managed by the server 380. In response, the server 380 may utilize an application server 384 to manage the pairing of clients and NASs.

The system 300 may include one or more host devices connected to one or more NAS devices and/or the redundancy management server 380, either directly or over the network 370. In certain embodiments, the system 300 may allow for remote backup, or replication, of at least a portion of data on a first NAS (e.g., NAS A) to another NAS (e.g., NAS B) over the network 370. For example, the external IP address and/or port number of the backup NAS 320B may be used to implement the backup process. Alternatively, a backup/replication relationship may be established through the redundancy management server 380, wherein the server 380 identifies the backup NAS (NAS B) and facilitates the connection between NAS A and NAS B, such that NAS A need not know the IP address or other identification information associated with NAS B.

Host A 310 A and/or NAS A 310A may enable a storage sharing feature, internally and/or at the server 380, wherein the user can opt to encrypt and distribute data stored locally to one or more other remote NAS's also enabling the storage sharing feature, thus creating an encrypted copy of the data on multiple NAS's owned by others, or other storage devices/systems enabling storage-sharing functionality. Such a storage sharing feature may be referred to herein as a "hive" feature. In certain embodiments, enabling of storage sharing functionality in a NAS device is performed using a software user interface on a host device. For example, a user may select an icon presented by the user interface or otherwise manifest an intention to select the hive feature in the NAS, wherein such selection is communicated to the NAS. Receipt of the hive-enabling selection by the NAS may trigger the NAS to download a firmware update, or otherwise modify its operation to accommodate hive interactions/transactions with other hive devices.

By enabling storage sharing, remote access connection speeds may be improved to an extent commensurate with the combined upload speeds associated with the shared drives. Furthermore, storage sharing can provide disaster protection through maintenance of one or more copies of data on shared drives. Downloading from data on a shared drive may be implemented according to BitTorrent protocol, or other file-sharing protocol involving simultaneous streaming from multiple locations/devices.

When NAS A (320 A) has the hive feature enabled, at least a portion of the storage space of NAS A may be used to house and distribute the data of other hive feature participants, or other storage devices/systems enabling hive storage-sharing functionality. The relationship between devices in a "hive" may be managed by the redundancy management server 380. For example, the server 380 may maintain NAS profile/relationship data in a data store 386. In certain embodiments, upon indicating a desire to enable the hive feature, a participating NAS receives from the redundancy management server 380 a firmware update to enable the feature.

By enabling the hive feature, a NAS's total usable capacity may be reduced in order to accommodate the sharing of other NAS's data on the drive. The percentage of the usable capacity designated for storage sharing can determine how many hive participants can use a given drive's storage and how many times the data on the drive is replicated. Replication of data across shared drives as described herein may provide improved remote access performance by host devices, such as mobile devices, computers and other internet connected devices.

In certain embodiments, a host device (e.g., Host A) may, itself, be configured to operate as a storage-sharing, or "hive," device. For example, Host A 310A may be configurable through a software interface running on the device to enable storage sharing functionality. A data storage module of the host 310A may provide storage for sharing among other storage-sharing devices (e.g., NAS A 320A, NASB 320B, etc.). When operating in storage-sharing mode, the host device 310A may be configured store one or more files in a first portion of the device's local non-volatile memory and designate a second portion of the memory as a shared portion of memory. The device 310A may further store one or more files from one or more other storage-sharing devices in the shared portion of memory. The device 310A may further be configured to upload at least a portion of the locally-stored file(s) to, for example, NAS B 320B or another storage-sharing device, wherein the uploading is performed substantially simultaneously with the upload of another portion of the file(s) to the storage-sharing device from at least one other storage-sharing device.

Figure 4:
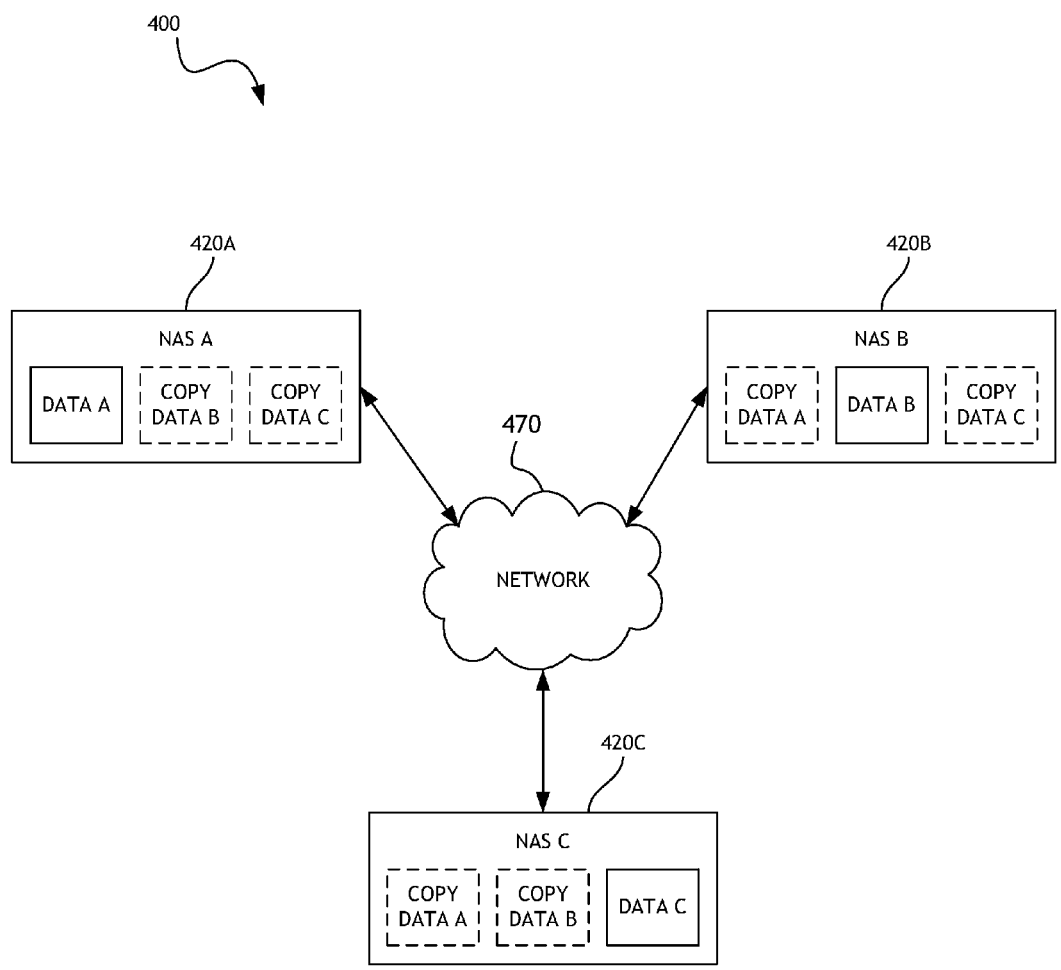
FIG. 4 is a diagram of a distributed data storage system according to an embodiment.

FIG. 4 illustrates an embodiment of a system 400 for sharing data storage among a plurality of network-attached storage devices (NASs). For example, as described in greater detail above, NAS A 420A may enable a storage sharing, or "hive," feature, thereby joining a pool of shared storage devices (i.e., a "hive"). When a user adds content to NAS A, at least a portion of the data may be both stored locally in the space reserved by the user and distributed to the other device(s) of the hive (e.g., NAS B 420B, NAS C 420C). Data may be replicated to other devices of the hive according to any suitable replication/redundancy protocol or mechanism, such as RAID.

In certain embodiments, data is stored on the distributed hive devices in a manner to facilitate data striping for increased data uploading performance. Striping may involve segmenting logically sequential user data, such as a file, so that consecutive segments are stored on different devices of the hive. Spreading data segments across multiple devices that can be accessed concurrently can help increase total data throughput, and can also help to balance I/O loads across the shared drives.

The hive storage sharing system 400 may further implement disk mirroring, wherein logical disk volumes are replicated onto separate drives of the hive, which may help to ensure continuous access to user data. For example, the system 400 may implement RAID 1 technology across the hive devices. Replicated data may comprise a complete copy of the user data, or may be only a partial copy.

Data replication from one NAS to another may be performed synchronously, asynchronously, semi-synchronously, or point-in-time. Furthermore, the system and/or NAS's may be configured to implement file-level shadowing and/or disk snapshots on shared drives in certain embodiments. Replication and/or distribution of data among the NAS devices may be enabled via code executed by on-device controllers or via server software. Furthermore, storage sharing may be implemented as a hardware solution, or in software within the operating system.

As shown in FIG. 4, a first drive, NAS A 420A, may include locally-stored user data (Data A), while one or more other NAS drives (NAS B 420B, NAS C 420C) each also maintain locally-stored user data (Data B, Data C). When each of the illustrated drives is configured in a hive mode, such that each of the drives belongs to the same hive group, copies of data from each of the drives may be stored in designated segments of the other shared drives. For example, NAS A may store copies of at least portions of Data B and/or Data C. In certain embodiments, Data A is stored redundantly within NAS A, as well as virtually redundantly based on being stored in physically-separate drives.

The data of a NAS stored on other devices may be protected/hidden, such that it is not substantially accessible/viewable by those operating the other devices. For example, NAS A may encrypt Data A, or otherwise store Data A in an encrypted state, and provide the encrypted data to NAS B and/or NAS C, without providing encryption key(s) or tools for interpreting the data. Therefore, NAS B and NAS C may simply regard Data A as unreadable file(s). Furthermore, the transmission of Data A to other drives may itself be an encrypted transmission, thereby providing further data security.

In certain embodiments, if NAS A is offline, Data A may still be available from, for example, NAS B or NAS C. Furthermore, Data A may be downloadable by a client device simultaneously from two or more of NAS A, NAS B and NAS C. For example, the data may be downloaded according to BitTorrent protocol, or a custom distributed file system technology. The speed of download may be determined at least in part by the number of hive devices participating in the download.

In certain embodiments, only certain files are copied to shared hive drives in the system 400. For example, only files determined to be important, frequently accessed, or of a certain type that may be desirable to be subject to relatively better accessibility or performance. Certain factors may be used to determine which files are designated as such, including, for example, frequency of access, data of creation, usability, other usage history and/or the like. Such files may be accessible with significantly greater download speed. Types of files that may be advantageously provisioned for greater download speed may include, for example, large video files.

In certain embodiments, the act of selecting a particular file or files for download may trigger uploading all or a portion of the file(s) to shared drives. The portion of storage space on other drives available to a drive may act as a cache for the drive. Furthermore, the shared storage space may be subject to dynamic rebalancing based on need or other considerations.

In certain embodiments, the system 400 allows for a user to add the hive feature to a NAS and give up a percentage of the NAS to other users who want to replicate across other devices. The larger the amount of space dedicated to sharing, the greater number of shared devices that may be able to engage in sharing with the user. Therefore, a user may in effect sacrifice capacity for improved performance. In certain embodiments, the network 470 is a local area network (LAN).

In certain embodiments, one or more of the storage devices illustrated in FIG. 4 is a storage system other than a network-attached storage device, such as a computer operating as a storage server. Furthermore, the various shared storage devices/systems may be operated or controlled by a single entity. That is, one or more of the shared storage devices/systems may serve as data storage for a single host. As an example, a single user, or group of users, may utilize data redundancy across a plurality of storage drives/systems operate or owned by the user, or group of users.

Distributed Data Access

Figure 5:
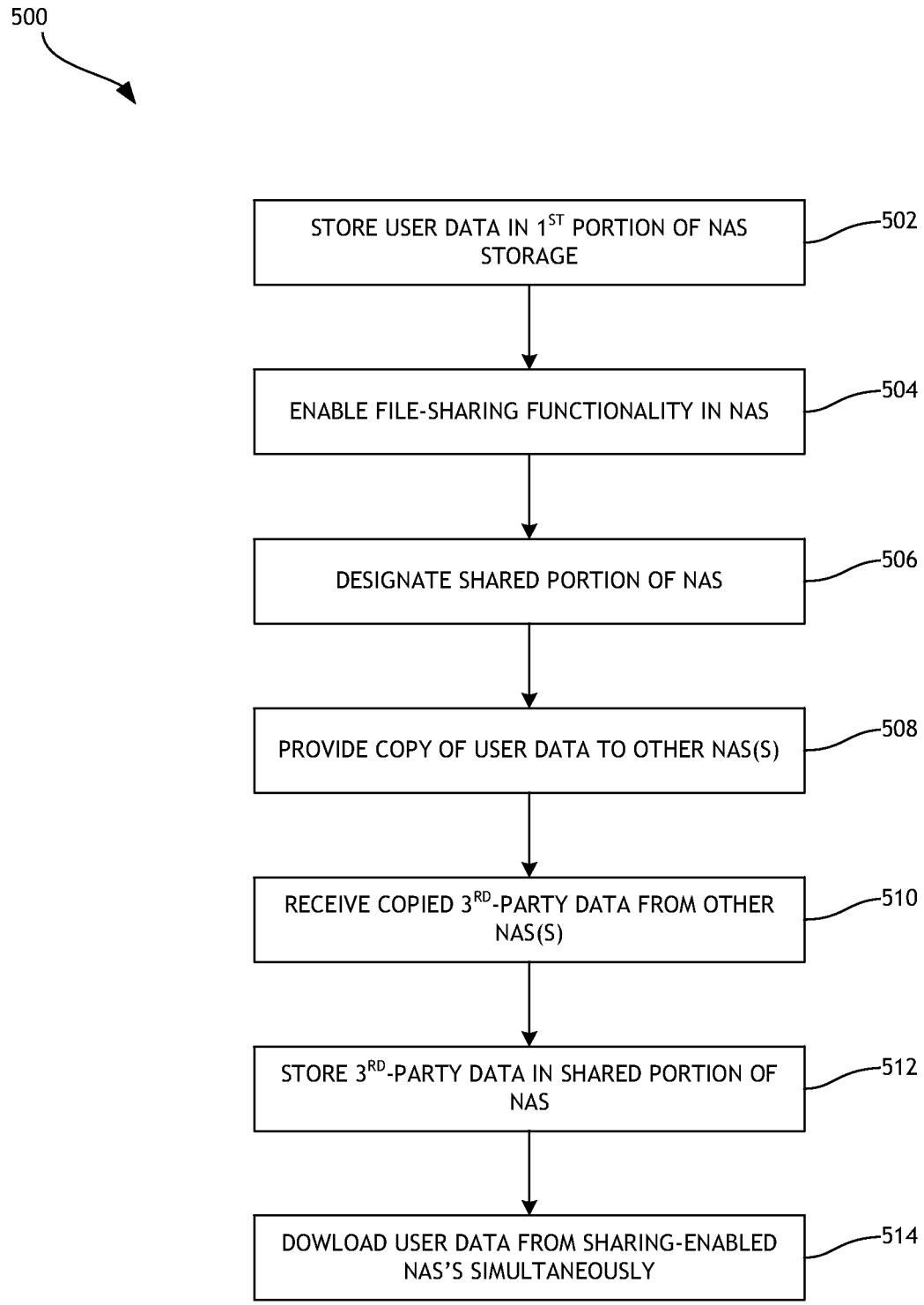
FIG. 5 is a flow diagram illustrating a process for managing data storage according to an embodiment.

FIG. 5 is a flow diagram illustrating a process 500 for managing data storage according to an embodiment. The process 500 includes storing user data in a first portion of a data storage device, such as a network-attached data storage device (NAS), at block 502. The NAS may be configured to implement file-sharing functionality according to one or more embodiments disclosed herein. At block 504, the process 500 involves enabling such file-sharing functionality of the NAS. The file-sharing functionality may be managed/controlled at least in part by a remote application server, software on a host computer device associated with the NAS, software/firmware of the NAS, itself, and/or other implementation software and/or hardware.

In connection with enabling the file-sharing functionality, the process 500 may involve designating a portion, such as defined by a logical and/or physical partition of one or more regions or portions of the data storage of the NAS, for shared storage use. Such data storage may include non-volatile memory, such as NAND flash or other solid-state memory, or other non-volatile media, such as magnetic media. The designated portion of shared storage may be utilized for storing data storage associated with one or more other storage devices and/or third party data storage systems.

The process 500 includes providing a copy of at least a portion of the local user data stored in the NAS to one or more other NAS devices or other data storage systems, such as data storage server(s) ("shared storage systems"), for storage in such other shared storage devices/systems. The shared storage systems may likewise have similar file-sharing functionality enabled, such that data stored at and associated with such systems is shared among the remaining shared storage systems, including the NAS. At block 510, copies of data stored in the one or more other NAS devices or other data storage devices/systems are received by the NAS, wherein such data is stored in the shared portion of the NAS at block 512. Therefore, the process 500 may result in the storage of user data associated with the NAS distributed among the NAS and other storage devices/systems.

The process 500 further involves accessing the distributed user data stored in the NAS and across the shared storage system(s). In certain embodiments, the process 500 involves accessing one or more files of user data, wherein such file(s) are accessed and uploaded from the distributed storage systems substantially simultaneously, such that data upload speeds are faster than uploading the file(s) solely from the NAS. Furthermore, in certain embodiments, each of the shared storage systems may likewise access files stored across distributed systems substantially simultaneously.

Additional Embodiments

Those skilled in the art will appreciate that in some embodiments, other types of distributed remote data access systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A network-attached storage device (NAS) comprising:
  a non-volatile memory module comprising:
    a first portion of non-volatile data storage configured to store local user data associated with a host computing device; and
    a second shared portion of non-volatile data storage configured to store third-party data; and
  a controller configured to:
    provide an indication to a remote redundancy management server directing the remote redundancy management server to enable storage sharing functionality for the NAS; and
    in response to said enabling:
      provide copies of the local user data to one or more remote NAS's having storage sharing functionality enabled for storage thereof in non-volatile data storage of the respective one or more remote NAS's, as directed by the redundancy management server;
      receive third-party data from each of the one or more remote NAS's; and
      store the received third-party data in the second portion of non-volatile data storage;
    wherein storage of the copies of the local user data in non-volatile data storage of the respective one or more remote NAS's provides non-volatile data redundancy for the user data according to a redundancy scheme.

2. The NAS of claim 1, wherein the controller is further configured to upload at least a portion of the user data to the host computing device simultaneously with uploading by the one or more remote NAS's of at least a portion of the copies of the user data to the host computing device, thereby improving data access speed.

3. The NAS of claim 1, further comprising a data encryption module, wherein the controller is further configured to encrypt the local user data using the encryption module.

4. The NAS of claim 1, wherein the copied local user data comprises video data.

5. The NAS of claim 1, wherein the copied local user data is identified by the controller as frequently-accessed data.

6. The NAS of claim 1, wherein:
  the received third-party data is encrypted; and
  neither the NAS nor the host computing device is configured to decrypt the encrypted third-party data.

7. The NAS of claim 1, wherein the redundancy scheme is a redundant array of independent disks (RAID) redundancy scheme.

8. The NAS of claim 1, wherein said providing the indication to the remote redundancy management server directs the remote redundancy management server to provide a firmware update for enabling storage sharing functionality to the NAS.

9. The NAS of claim 1, wherein the shared portion of non-volatile data storage is substantially unusable for storage of local user data.

10. A distributed data storage system comprising:
  a first host computing device;
  a first network-attached storage device (NAS) communicatively coupled to the first host computing device, the first NAS including a first portion of non-volatile data storage configured to store first user data associated with the first host computing device;
  a second host computing device;
  a second NAS communicatively coupled to the second host computing device, the second NAS including a first portion of non-volatile data storage configured to store second user data associated with the second host computing device and a second portion of non-volatile data storage configured to store a copy of at least a portion of the first user data; and
  a remote redundancy management server configured to direct communication of the at least a portion of the first user data from the first NAS to the second NAS for storage in the second portion of non-volatile data storage of the second NAS and at least a portion of the second user data from the second NAS to the first NAS for storage in a second portion of non-volatile data storage of the first NAS.

11. The system of claim 10, wherein the first host computing device is configured to access the first user data by substantially simultaneously downloading a portion of the first user data from the first NAS and a portion of the copy of the first user data from the second NAS.

12. The system of claim 10, wherein the first host computing device is further configured to download the first user data from the second NAS responsive to a determination that the first NAS is substantially inaccessible by the first host computing device.

13. The system of claim 10, wherein the second portion of non-volatile data storage of the second NAS is further configured to store a copy of third user data stored on a third NAS according to relationship data maintained by the redundancy management server.

14. A method of managing data storage, the method comprising:
    storing user data in a first portion of non-volatile data storage of a first network-attached storage device (NAS);
    enabling file-sharing functionality of the first NAS at least in part by sending an indication to a remote redundancy management server;
    designating a second portion of non-volatile data storage of the first NAS for shared data storage in connection with said enabling;
    providing a copy of at least a portion of the user data to a second NAS for storage therein according to a file-sharing relationship managed by the redundancy management server;
    receiving a copy of third-party data from the second NAS according to the file-sharing relationship;
    storing the copy of the third-party data in the second portion of non-volatile data storage of the first NAS;
    downloading at least a portion of the user data from the first NAS; and
    downloading at least a portion of the copy of the at least a portion of the user data from the second NAS.

15. The method of claim 14, wherein said downloading the at least a portion of the user data from the first NAS and said downloading the at least a portion of the copy of the at least a portion of the user data from the second NAS are performed substantially simultaneously.

16. The method of claim 14, further comprising encrypting the user data.

17. The method of claim 14, further comprising selecting the portion of copied data to provide to the second NAS based on frequency of access information.

18. The method of claim 14, wherein said enabling file-sharing functionality of the first NAS comprises downloading a firmware update to the first NAS.

19. A computing device comprising:
    a processor; and
    a computer-readable medium having stored thereon instructions that, when executed by the processor, cause the processor to:
        provide an indication to a remote redundancy management server directing the remote redundancy management server to enable storage sharing functionality of a first data storage device having a first file stored in a first portion of non-volatile memory thereof;
        designate a second portion of the non-volatile memory of the first data storage device as a shared portion of the non-volatile memory, wherein the first data storage device is configured to store a second file from a second data storage device in the shared portion of the non-volatile memory; and
        download a first portion of the first file from the first data storage device and a second portion of the first file from the second data storage device.

20. The computing device of claim 19, wherein said downloading the first portion of the first file from the first data storage device and the second portion of the first file from the second data storage device is performed substantially simultaneously, thereby improving data access speed for accessing the first file.

21. The computing device of claim 19, wherein the instructions are further configured to cause the processor to upload a portion of the first file to a second computing device, the upload performed substantially simultaneously with uploading of another portion of the first file to the second computing device from at least one of the first or second data storage device.

* * * * *